(12) United States Patent
Walmsley

(10) Patent No.: US 7,307,756 B2
(45) Date of Patent: *Dec. 11, 2007

(54) COLOUR CONVERSION METHOD

(75) Inventor: Simon Robert Walmsley, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 317 days.

This patent is subject to a terminal disclaimer.

(21) Appl. No.: 10/943,907

(22) Filed: Sep. 20, 2004

(65) Prior Publication Data

US 2005/0041259 A1     Feb. 24, 2005

Related U.S. Application Data

(63) Continuation of application No. 09/575,167, filed on May 23, 2000, now Pat. No. 6,804,026.

(30) Foreign Application Priority Data

May 25, 1999    (AU) .................................... PQ0560

(51) Int. Cl.
G06F 15/00 (2006.01)
G03F 3/08 (2006.01)
H04N 1/46 (2006.01)

(52) U.S. Cl. ......................... 358/1.9; 358/523; 358/525

(58) Field of Classification Search .............. 358/1.9, 358/523, 1.1, 525, 518, 520, 530, 3.23, 1.16, 358/504, 515; 382/162, 167, 300, 305, 307
See application file for complete search history.

(56) References Cited

U.S. PATENT DOCUMENTS

| | | | | |
|---|---|---|---|---|
| 4,275,413 A | | 6/1981 | Sakamoto et al. | |
| 5,197,014 A | * | 3/1993 | Seki et al. | 700/189 |
| 5,355,232 A | * | 10/1994 | Kataoka | 358/451 |
| 5,374,995 A | * | 12/1994 | Loveridge et al. | 358/447 |
| 5,471,324 A | | 11/1995 | Rolleston | |
| 5,592,312 A | | 1/1997 | Noguchi | |
| 5,592,591 A | | 1/1997 | Rolleston | |
| 5,619,590 A | * | 4/1997 | Moore, Jr. | 382/162 |
| 5,699,491 A | * | 12/1997 | Barzel | 358/1.9 |
| 5,786,908 A | * | 7/1998 | Liang | 358/518 |
| 5,809,181 A | | 9/1998 | Metcalfe | |
| 5,929,946 A | * | 7/1999 | Sharp et al. | 349/18 |
| 6,011,585 A | * | 1/2000 | Anderson | 348/272 |
| 6,078,307 A | * | 6/2000 | Daly | 345/600 |
| 6,392,699 B1 | * | 5/2002 | Acharya | 348/273 |
| 6,415,065 B1 | * | 7/2002 | Miyake | 382/300 |
| 6,466,618 B1 | * | 10/2002 | Messing et al. | 375/240.01 |
| 6,473,123 B1 | * | 10/2002 | Anderson | 348/230.1 |
| 6,493,467 B1 | * | 12/2002 | Okuda et al. | 382/260 |

(Continued)

FOREIGN PATENT DOCUMENTS

WO    WO 99/04368    1/1999

*Primary Examiner*—Madeleine A V Nguyen

(57) ABSTRACT

A color conversion method and apparatus for a compact printer system. An image processor converts a stored image from a first tri-color space to a second tri-color space. Resultant transformation values are read from lookup tables for each color component of the stored image pixels and a single cycle interpolator unit performs linear interpolation to generate a single color component in the second tri-color space in 14 cycles. In one example, the L*a*b* color space is converted to CMY color space. In another example, the RGB form is converted to the L*a*b* form and two extra L* components for use in sharpening a converted image.

8 Claims, 14 Drawing Sheets

U.S. PATENT DOCUMENTS

| | | | |
|---|---|---|---|
| 6,546,132 B1 * | 4/2003 | Bhattacharjya et al. | 382/167 |
| 6,563,538 B1 * | 5/2003 | Utagawa | 348/273 |
| 6,690,731 B1 * | 2/2004 | Gough et al. | 375/240.18 |
| 6,762,756 B2 * | 7/2004 | Lewis et al. | 345/419 |
| 6,804,026 B1 * | 10/2004 | Walmsley | 358/1.9 |
| 6,804,030 B1 * | 10/2004 | Walmsley et al. | 358/3.07 |
| 6,807,315 B1 * | 10/2004 | Walmsley et al. | 382/263 |
| 6,809,765 B1 * | 10/2004 | Tao | 348/273 |
| 6,836,289 B2 * | 12/2004 | Koshiba et al. | 348/273 |
| 6,856,704 B1 * | 2/2005 | Gallagher et al. | 382/263 |
| 2001/0028407 A1 * | 10/2001 | Joo | 348/453 |
| 2005/0151790 A1 * | 7/2005 | Walmsley | 347/43 |

* cited by examiner

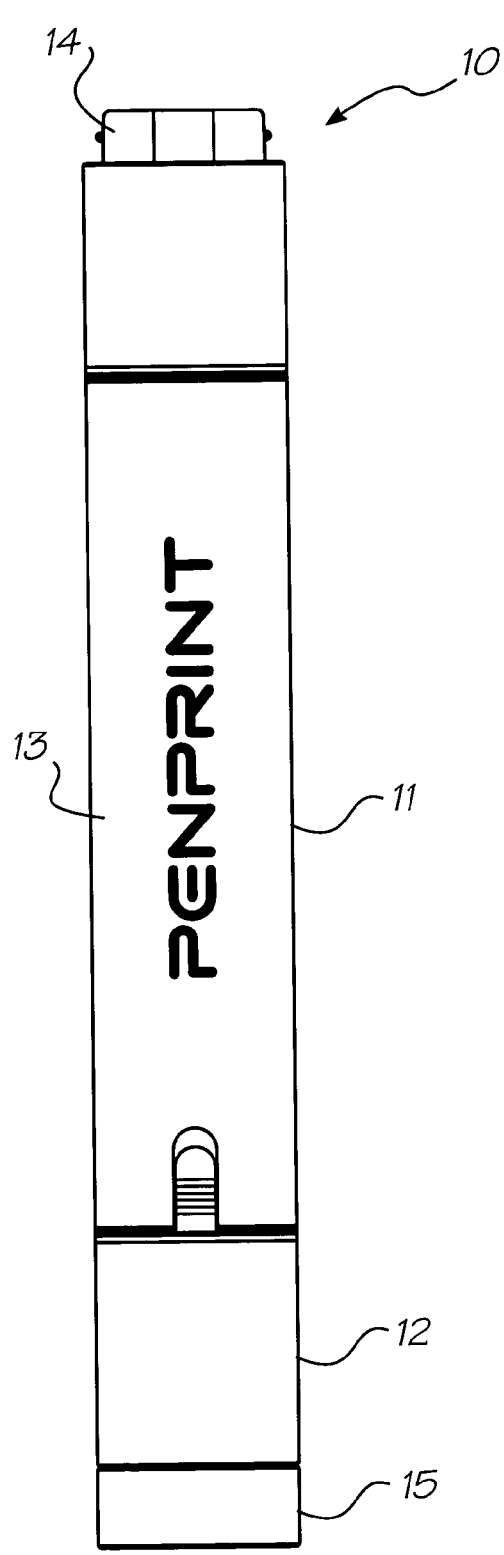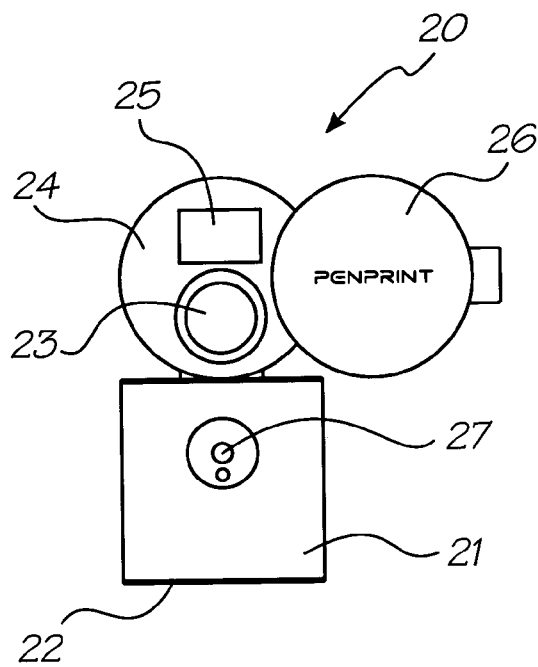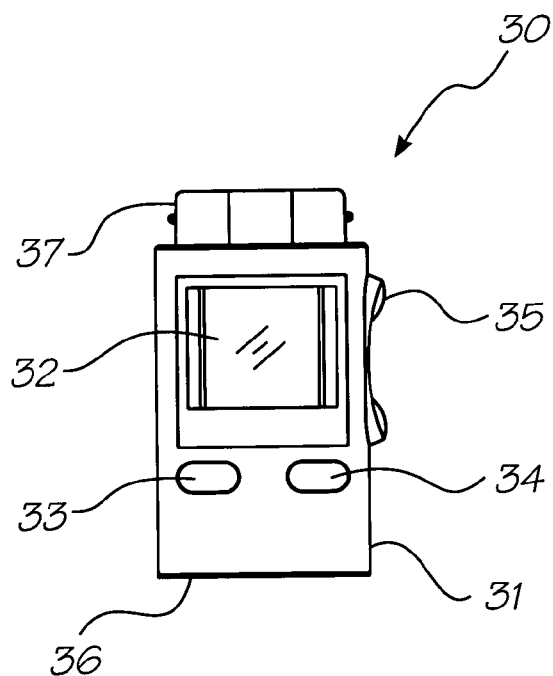
FIG. 1
FIG. 2
FIG. 3

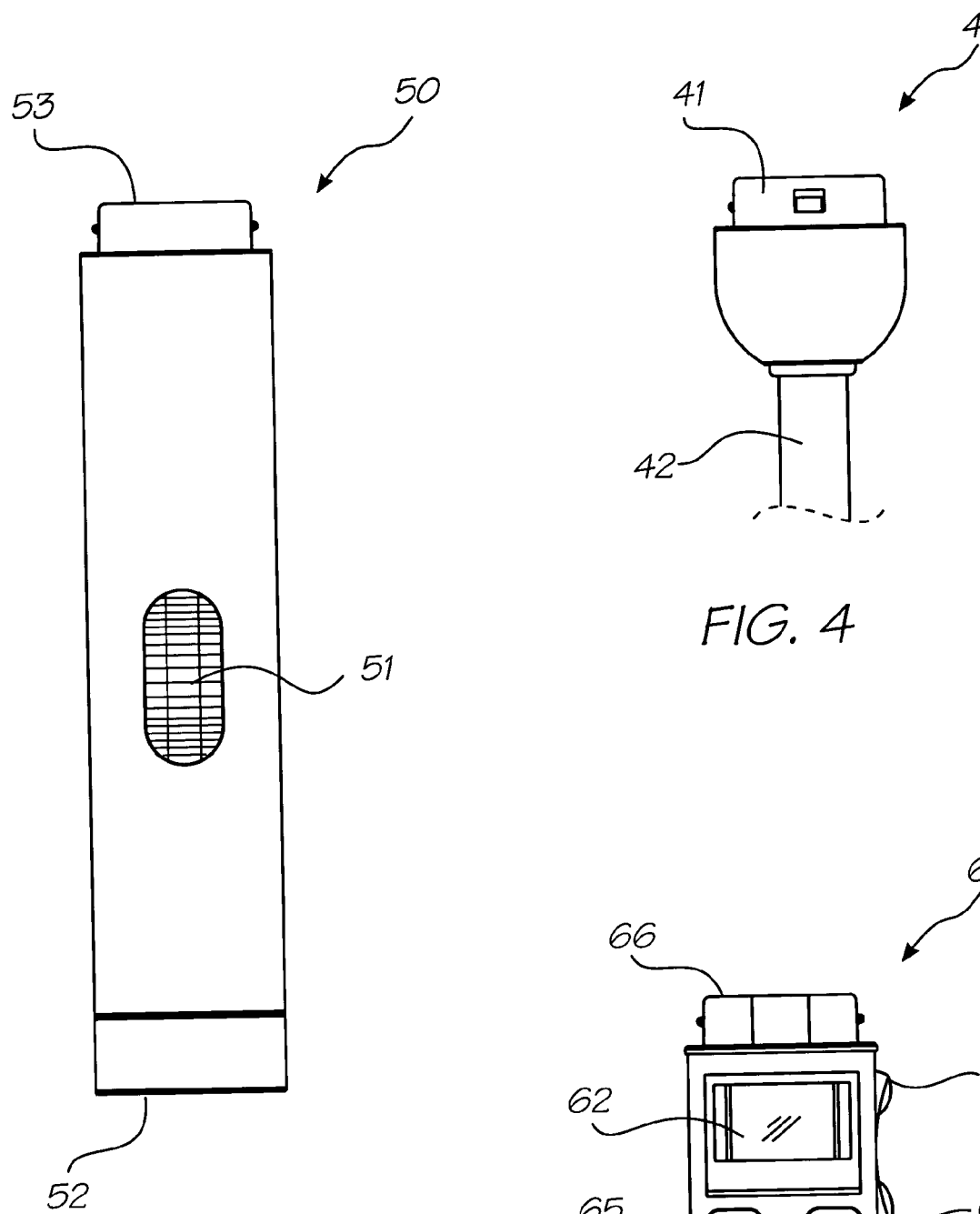
FIG. 4
FIG. 5
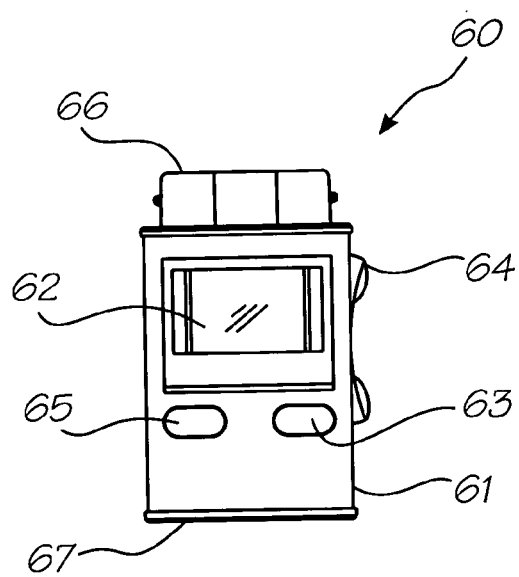
FIG. 6

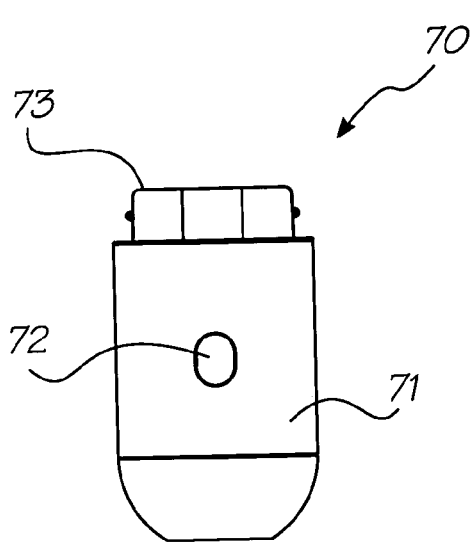
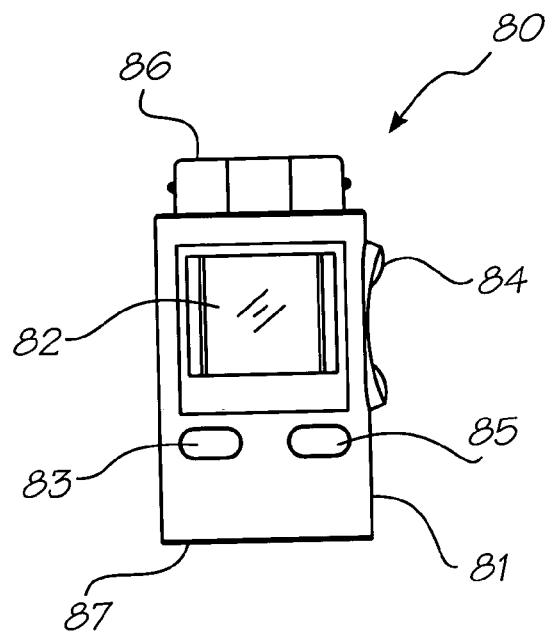
FIG. 7          FIG. 8
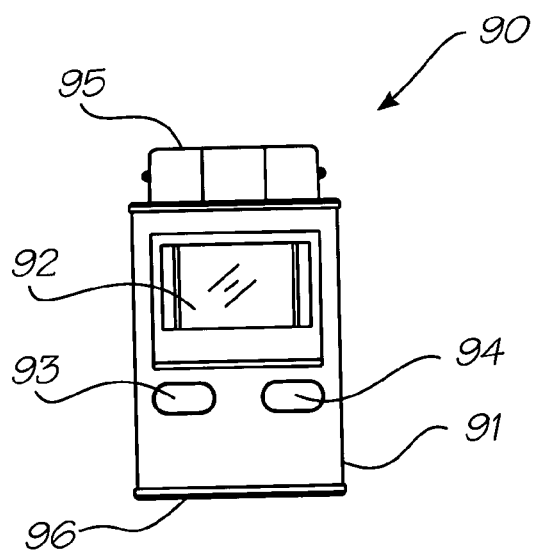
FIG. 9

COLOUR CONVERSION METHOD

CROSS-REFERENCE TO RELATED APPLICATIONS

This is a Continuation Application of U.S. application Ser. No. 09/575,167, filed on May 23, 2000, now issued U.S. Pat. No. 6,804,026, all of which are herein incorporated by reference.

FIELD OF THE INVENTION

The invention relates to a compact printer system able to print full-color, business card size documents from a device about the size of a pen. The system includes various hot-connectable modules that provide a range of functions. In particular the invention relates to a color conversion method for a compact printer system.

Reference may be had to co-pending applications claiming priority from Australian Provisional Patent Application number PQ0560 dated 25 May 1999. The co-pending applications describe related modules and methods for implementing the compact printer system. The co-pending applications are as follows:

| USSN | Our Title |
| --- | --- |
| 6,924,907 | Compact Color Printer Module |
| 6,712,452 | Modular Compact Printer System |
| 6,416,160 | Nozzle Capping Mechanism |
| 6,238,043 | Ink Cartridge for Compact Printer System |
| 6,958,826 | Controller for Printer Module |
| 6,812,972 | Camera Module for Compact Printer System |
| 09/575,157 | Image Processor for Camera Module |
| 6,554,359 | Memory Module for Compact Printer System |
| 6,967,741 | Effects Module for Compact Printer System |
| 6,956,669 | Effects Processor for Effects Module |
| 6,903,766 | Timer Module for Compact Printer System |
| 09/575,120 | Method and Apparatus of Dithering |
| 6,975,429 | Method and Apparatus of Image Conversion |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support. For instance, it is impractical to carry a color printer for the purpose of instantly printing photographs taken with known compact digital cameras.

A compact printhead has been described in co-pending United States patent applications filed simultaneously to the present application and hereby incorporated by cross reference:

| USSN | Our Title |
| --- | --- |
| 09/575,152 | Fluidic seal for an ink jet nozzle assembly |
| 6,428,133 | Ink jet printhead having a moving nozzle with an externally arranged actuator |
| 6,526,658 | Method of manufacture of an ink jet printhead having a moving nozzle with an externally arranged actuator |
| 09/575,176 | Ink jet printhead nozzle array |
| 6,390,591 | Nozzle guard for an ink jet printhead |

SUMMARY OF THE INVENTION

In one form, the invention resides in a method of converting, in an image processor, from a first tri-color space to a second tri-color space, said method comprising the steps of:

reading color components of pixels of an image stored in a first tri-color space;

performing tri-linear conversion of said color components from said first color space to said second color space by executing a single interpolation in each cycle; and storing said converted color components in a specific storage location.

Further features of the invention will be evident from the following description.

BRIEF DESCRIPTION OF THE DRAWINGS

In order to assist with describing preferred embodiments of the invention, reference will be made to the following figures in which:

FIG. 1 is a printer module;
FIG. 2 is a camera module;
FIG. 3 is a memory module;
FIG. 4 is a communication module;
FIG. 5 is a flash module;
FIG. 6 is a timer module;
FIG. 7 is a laser module;
FIG. 8 is an effects module;
FIG. 9 is a characters module.

DETAILED DESCRIPTION OF THE PREFERRED EMBODIMENTS

Figure 11:
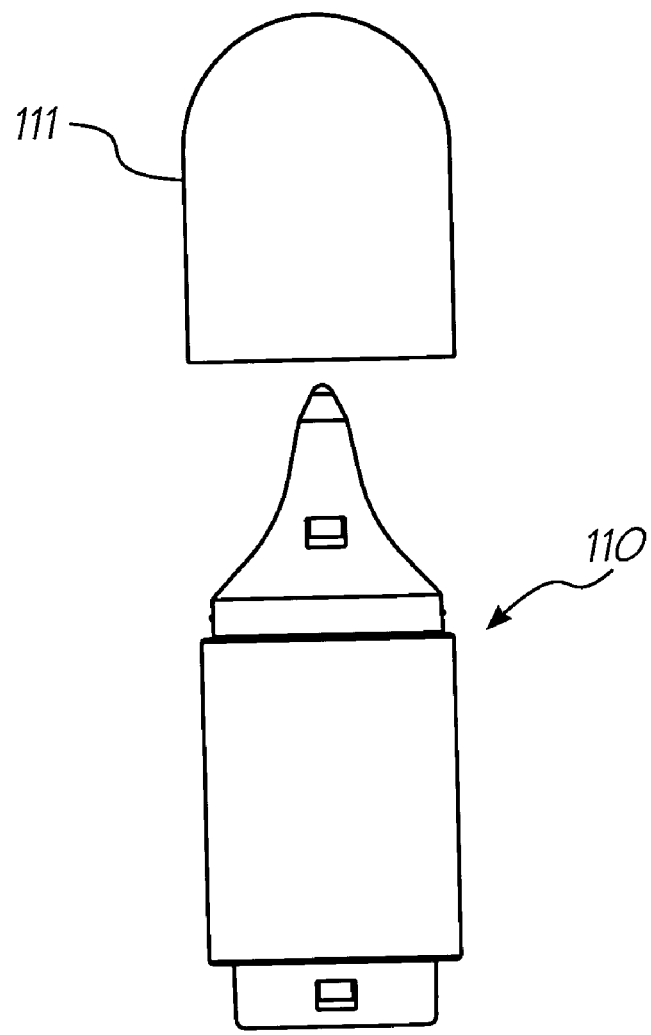
FIG. 11 is a pen module.

Referring to FIGS. 1 to 12, there are shown various modules that together form a compact printer system. Individual modules can be attached and detached from the compact printer configuration to allow a user-definable solution to business-card sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any order. Certain modules only have a male or a female connector, but this is determined by the function of the module. Adaptor modules allow these single-connector modules to be connected at either end of a given compact printer configuration.

A four wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Compact printer modules can be grouped into three types:
  image processing modules including a Printer Module (FIG. 1), a Camera Module (FIG. 2), and a Memory Module (FIG. 3). Image processing modules are primarily what sets the compact printer system apart from other pen-like devices. Image processing modules capture, print, store or manipulate photographic images;
  housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and
  isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

FIG. 1 shows a printer module that incorporates a compact printhead described in co-pending United States patent applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 μm in diameter, and spaced 15.875 μm apart. Because the printing is bi-level, the input image should be dithered or error-diffused for best results. Typically a Memjet printhead for a particular application is page-width. This enables the printhead to be stationary and allows the paper to move past the printhead. A Memjet printhead is composed of a number of identical ½ inch Memjet segments.

The printer module 10 comprises a body 11 housing the Memjet printhead. Power is supplied by a three volt battery housed in battery compartment 12. The printhead is activated to commence printing when a business card (or similar sized printable media) is inserted into slot 13. Male connector 14 and female connector 15 facilitate connection of other modules to the printer module 10.

FIG. 2 shows a camera module 20. The camera module provides a point-and-shoot camera component to the compact printer system as a means of capturing images. The camera module comprises a body 21 having a female connector 22. A lens 23 directs an image to an image sensor and specialized image processing chip within the camera 24. A conventional view finder 25 is provided as well as a lens cap 26. An image is captured when the Take button 27 is pushed. Captured images are transferred to the Printer Module 10 for subsequent printing, manipulation, or storage. The Camera Module also contains a self-timer mode similar to that found on regular cameras.

FIG. 3 shows a Memory Module 30 comprising a body 31, LCD 32, IN button 33, OUT button 34 and SELECT button 35. The Memory Module 30 is a standard module used for storing photographic images captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37. The male and female connectors allow the module to be connected at either end of a configuration. Power is provided from the Printer Module 10 via the Serial Bus.

A Communications Module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10.

A Flash Module 50 is shown in FIG. 5. The Flash Module 50 is used to generate a flash with flash cell 51 when taking photographs with the Camera Module 20. The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

The Effects Module shown in FIG. 8 is an image processing module. It allows a user to select a number of effects and applies them to the current image stored in the Printer Module 10. The effects include borders, clip-art, captions, warps, color changes, and painting styles. The Effects Module comprises a body 81 housing custom electronics and a LCD 82. A CHOOSE button 83 allows a user to choose between a number of different types of effects. A SELECT button 84 allows the user to select one effect from the number of effects of the chosen type. Pressing the APPLY button 85 applies the effect to image stored in the Printer Module 10. The Effects Module obtains power from the Serial Bus. Male connector 86 and female connector 87 allow the Effects Module to be connected to other compact printer system modules.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
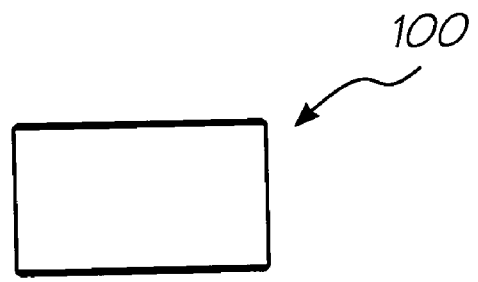
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
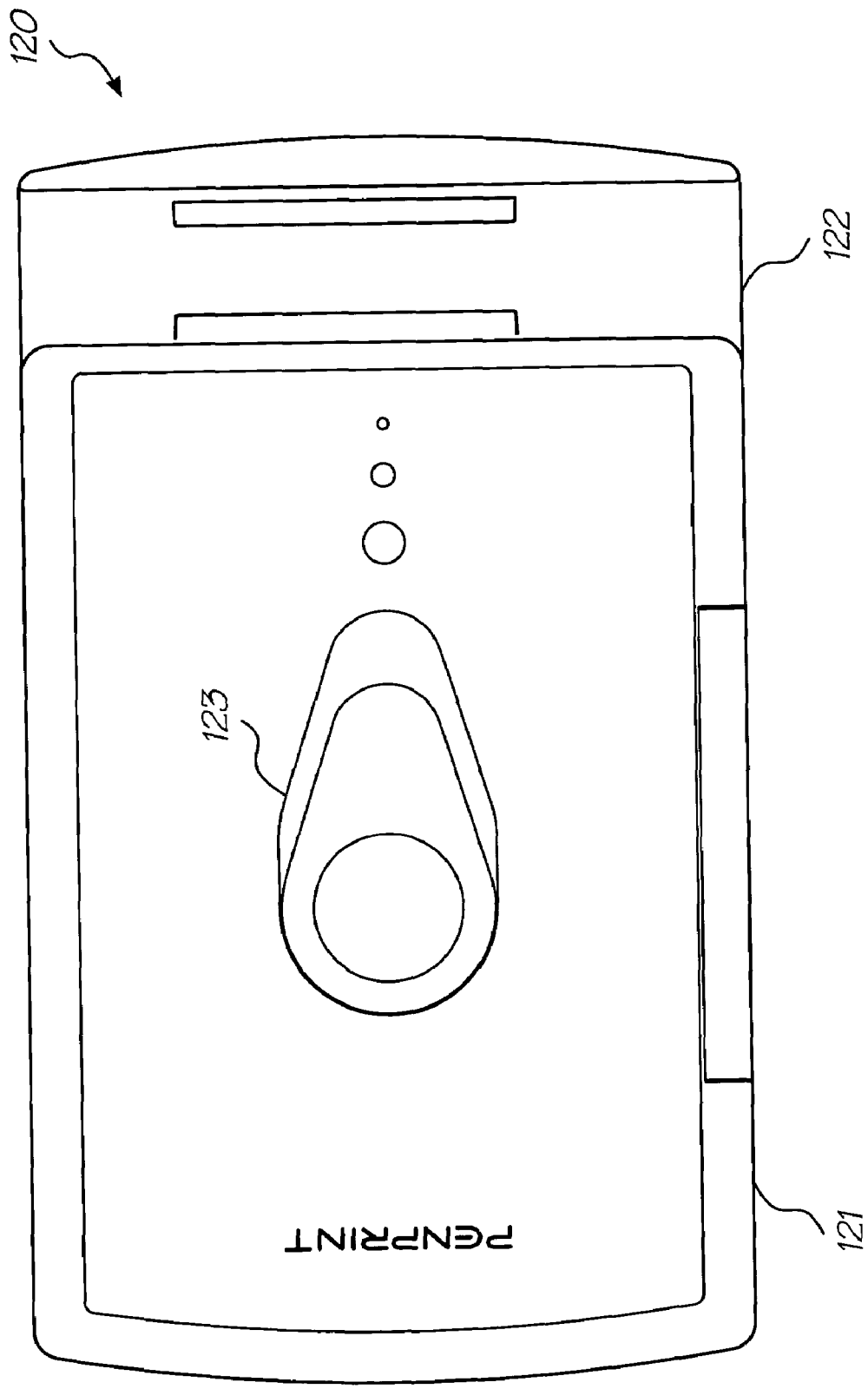
FIG. 12 is a dispenser module.

To assist with accurately feeding a business card sized print media into slot 13 of the printer module 10, a dispenser module 120 is provided as shown in FIG. 12. The dispenser module 120 comprises a body 121 that holds a store of business card sized print media. A Printer Module 10 locates into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module 10. The Printer Module holds a single photographic image that can be printed out via its Memjet printer. It also contains the 3V battery required to power the compact printer system.

Figure 13:
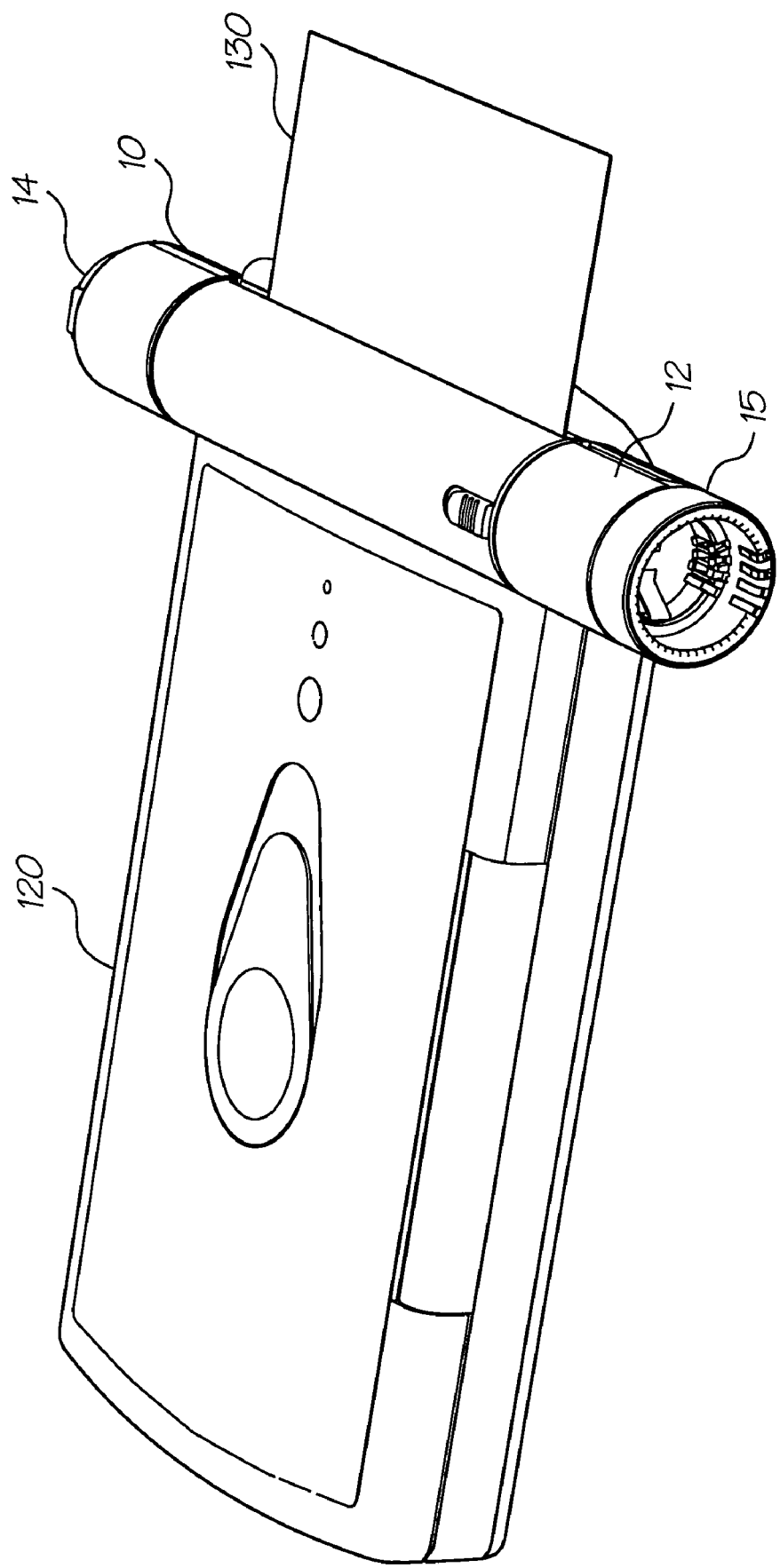
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
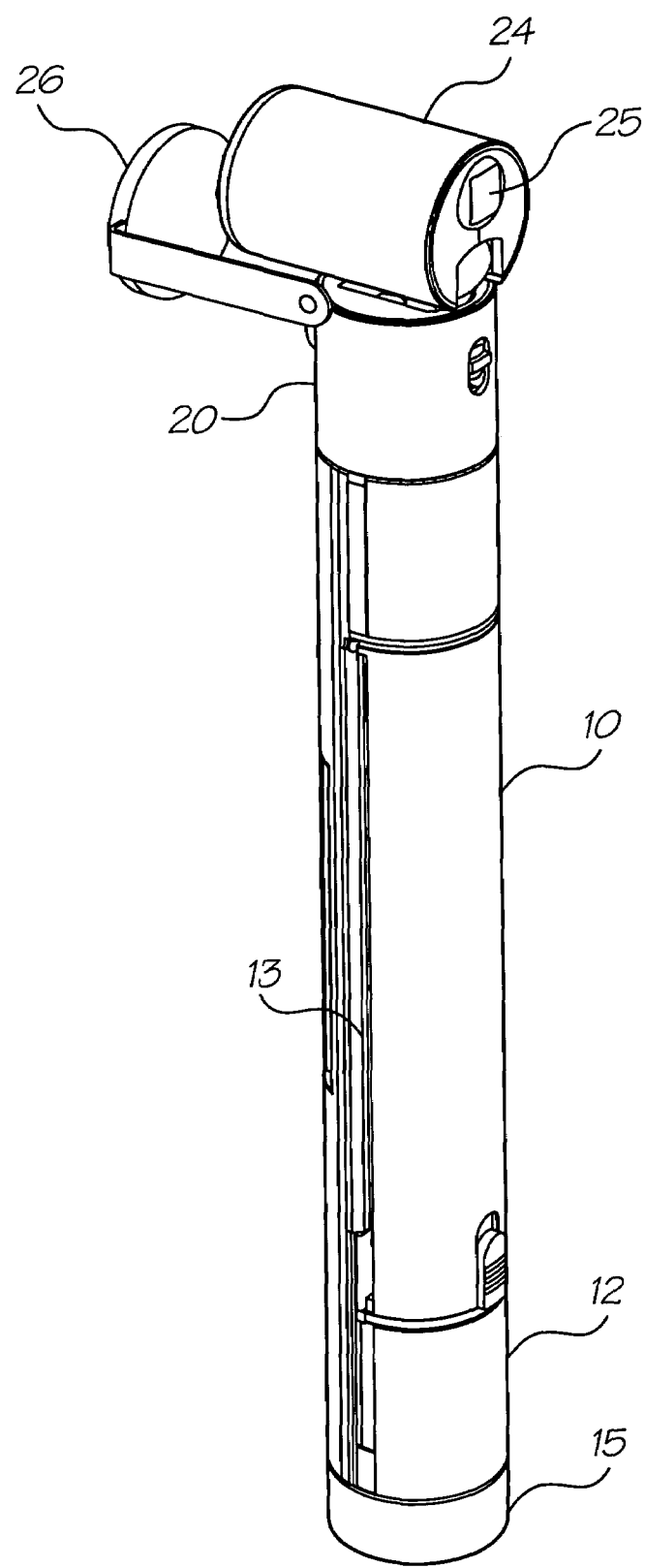
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
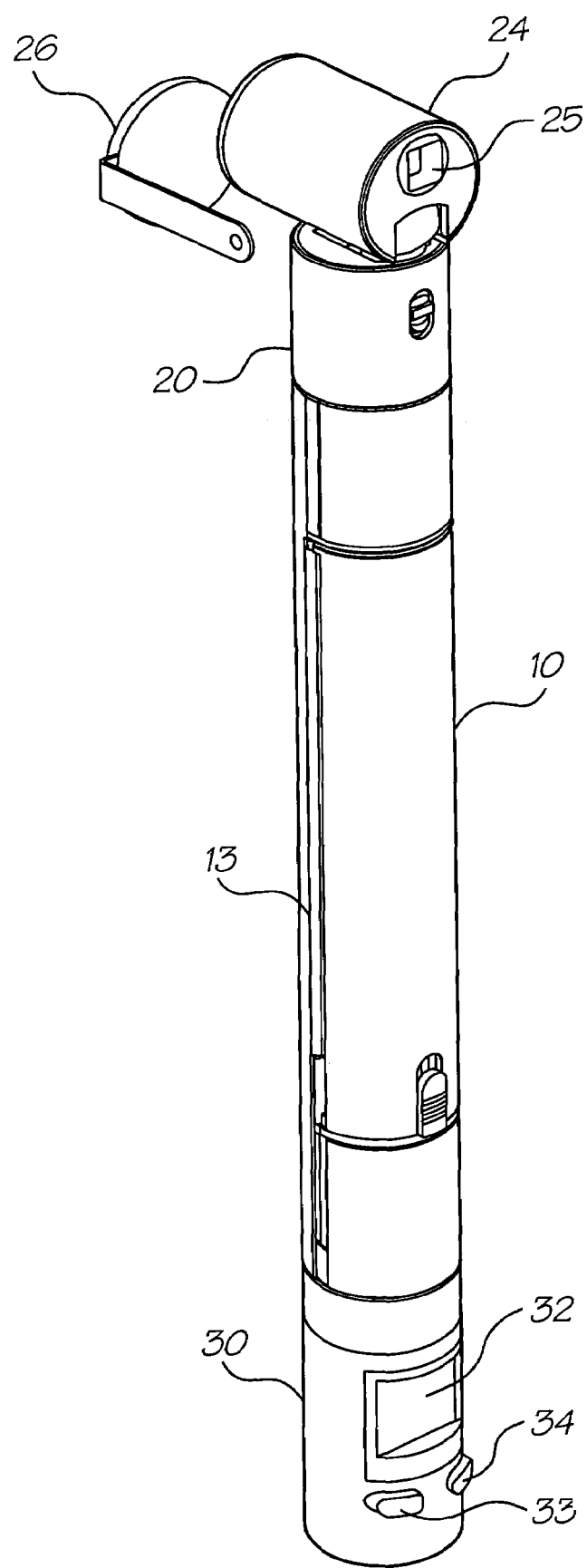
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
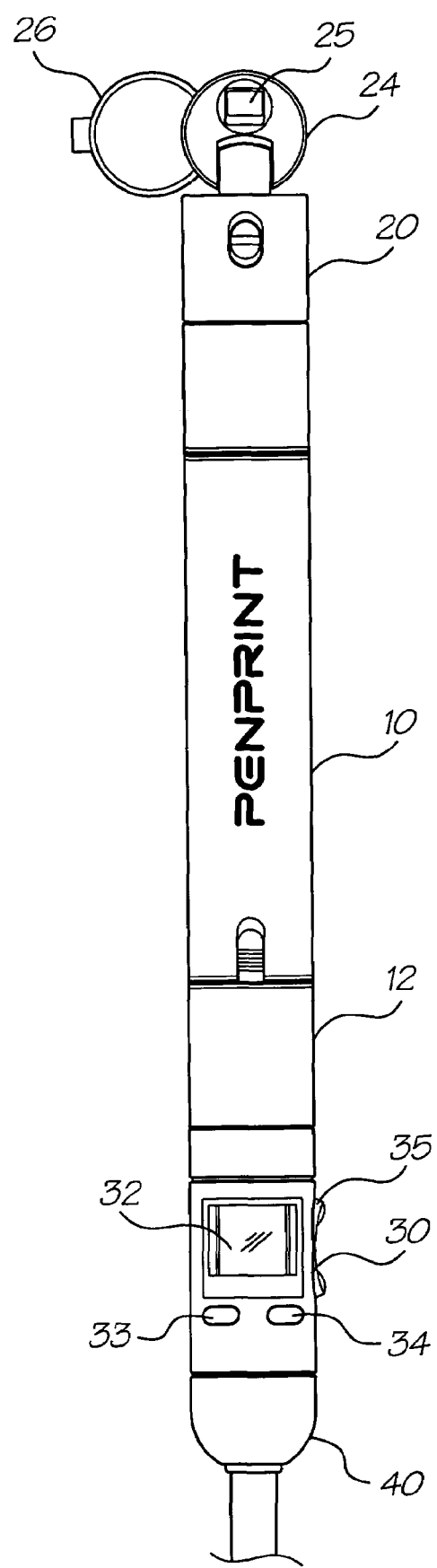
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

The standard image type has a single conceptual definition. The image definition is derived from the physical attributes of the printhead used in the Printer Module. The printhead is 2 inches wide and prints at 1600 dpi in cyan, magenta and yellow bi-level dots. Consequently a printed image from the compact printer system is 3200 bi-level dots wide.

The compact printer system prints on business card sized pages (85 mm×55 mm). Since the printhead is 2 inches wide, the business cards are printed such that 1 line of dots is 2 inches. 2 inches is 50.8 mm, leaving a 2 mm edge on a standard business-card sized page. The length of the image is derived from the same card size with a 2 mm edge. Consequently the printed image length is 81 mm, which equals 5100 1600 dpi dots. The printed area of a page is therefore 81 mm×51 mm, or 5100×3200 dots.

To obtain an integral contone to bi-level ratio a contone resolution of 267 ppi (pixels per inch) is chosen. This yields a contone CMY page size of 850×534, and a contone to bi-level ratio of 1:6 in each dimension. This ratio of 1:6 provides no perceived loss of quality since the output image is bi-level.

The printhead prints dots in cyan, magenta, and yellow ink. The final output to the printed page must therefore be in the gamut of the printhead and take the attributes of the inks into account. It would at first seem reasonable to use the CMY color space to represent images. However, the printer's CMY color space does not have a linear response. This is definitely true of pigmented inks, and partially true for dye-based inks. The individual color profile of a particular device (input and output) can vary considerably. Image capture devices (such as digital cameras) typically work in RGB (red green blue) color space, and each sensor will have its own color response characteristics.

Consequently, to allow for accurate conversion, as well as to allow for future image sensors, inks, and printers, the CIE L*a*b* color model [CIE, 1986, CIE 15.2 Colorimetry: Technical Report ($2^{nd}$ Edition), Commission Internationale De l'Eclairage] is used for the compact printer system. L*a*b* is well defined, perceptually linear, and is a superset of other traditional color spaces (such as CMY, RGB, and HSV).

The Printer Module must therefore be capable of converting L*a*b* images to the particular peculiarities of its CMY color space. However, since the compact printer system allows for connectivity to PCs, it is quite reasonable to also allow highly accurate color matching between screen and printer to be performed on the PC. However the printer driver or PC program must output L*a*b*.

Each pixel of a compact printer image is therefore represented by 24 bits: 8 bits each of L*, a*, and b*. The total image size is therefore 1,361,700 bytes (850×534×3).

Each image processing module is able to access the image stored in the Printer Module. The access is either to read the image from the Printer Module, or to write a new image to the Printer Module.

The communications protocol for image access to the Printer Module provides a choice of internal image organization. Images can be accessed either as 850×534 or as 534×850. They can also be accessed in interleaved or planar format. When accessed as interleaved, each pixel in the image is read or written as 24 bits: 8 bits each of L*, a*, b*. When accessed as planar, each of the color planes can be read or written independently. The entire image of L* pixels, a* pixels or b* pixels can be read or written at a time.

Figure 17:
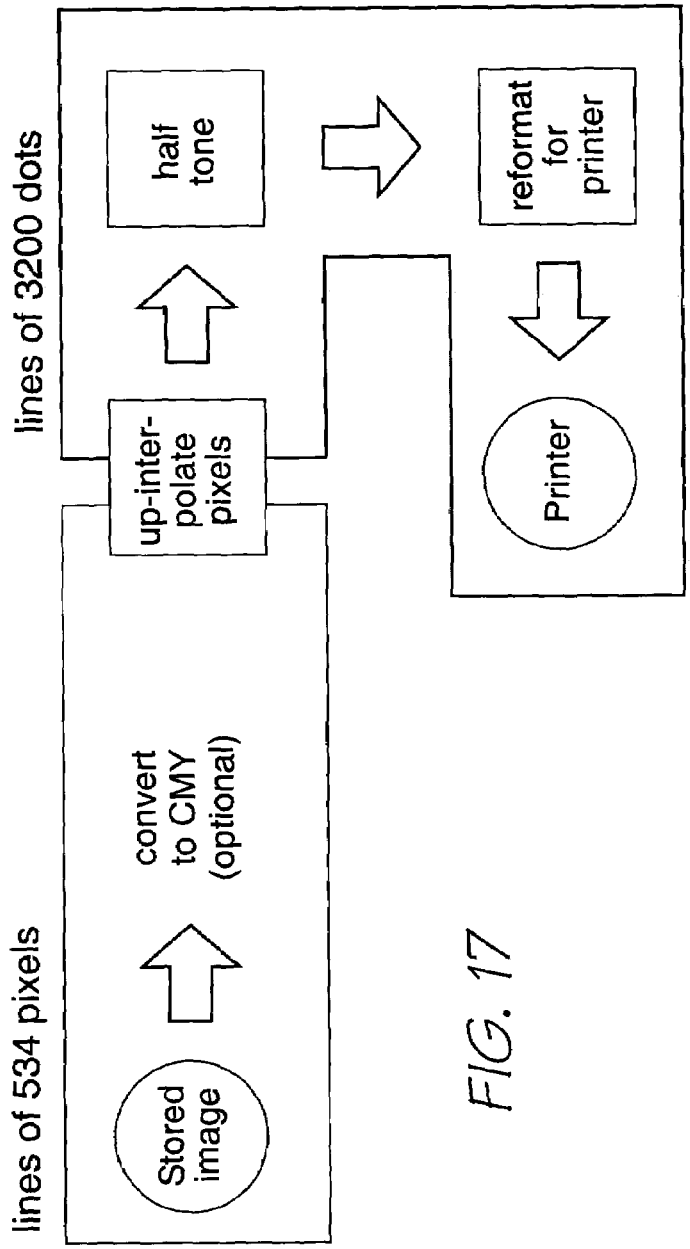
FIG. 17 illustrates the Image Print Chain.

The Image Print Chain is concerned with taking an existing, stored image from memory and printing it to a Memjet printer. There are a number of steps required in the image processing chain in order to produce high quality 1600 dpi prints from 267 ppi images. FIG. 17 illustrates the Image Print Chain. The present invention is concerned with the method of converting from one tri-color space to another.

As previously discussed, the printer's CMY color space does not have a linear response and consequently, the L*a*b* color model is used for the compact printer system. The Printer Module 10 has the capability to convert from the well defined and perceptually linear L*a*b* to the particular peculiarities of its CMY color space. Additionally, there is the possibility of a PC performing high quality color space conversion before downloading an image to the compact Printer Module 10.

Figure 18:
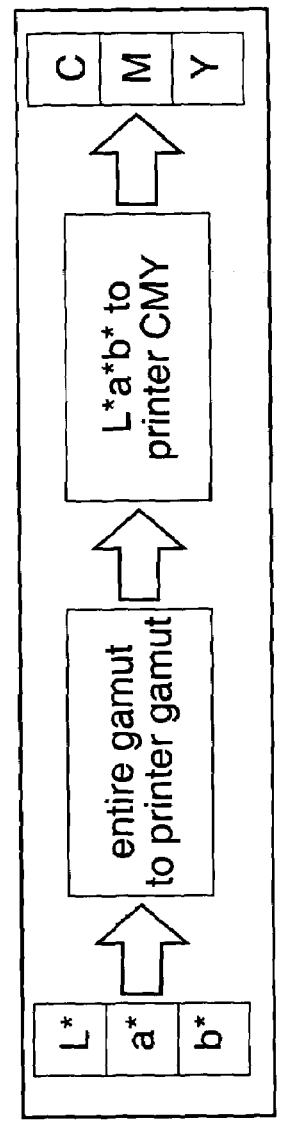
FIG. 18 illustrates the transformations required for L*a*b* to CMY color conversion.

The stored image is therefore defined in terms of the L*a*b* or CMY color space. If it is in the L*a*b* color space, it must be converted to CMY before being printed out. Rather than convert the L*a*b* to CMY in situ, the conversion is done on-the-fly during the print process. This allows the L*a*b* image to be exported from the Printer Module 10 in a portable color space format. The transformations required for color conversion are shown in FIG. 18. If the image is already in CMY (for example, downloaded from a PC with CMY generated by the PC), the color conversion step is bypassed.

Figure 19:
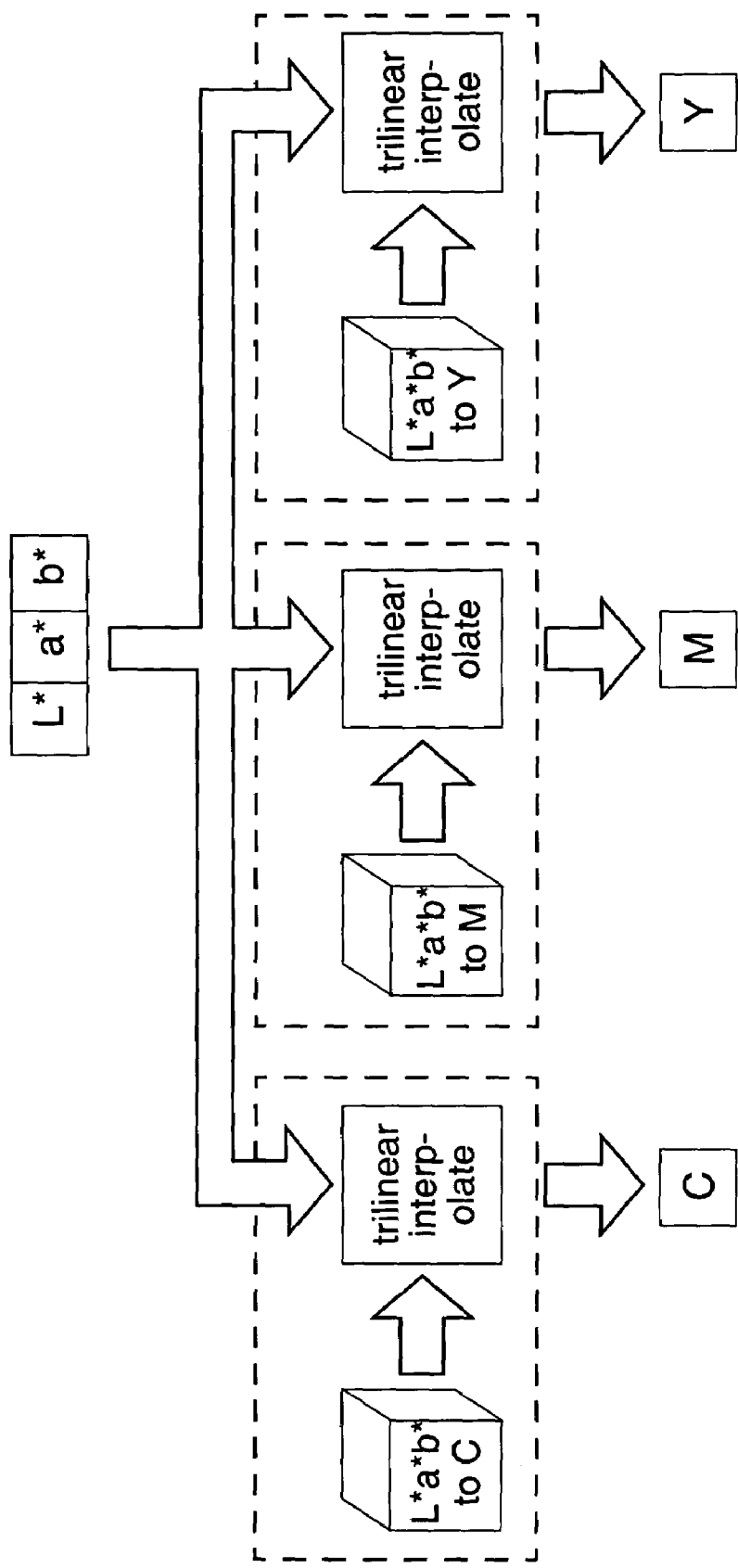
FIG. 19 represents a tri-linear conversion from L*a*b* to CMY.

Rather than perform these transformations exhaustively, excellent results can be obtained via a tri-linear conversion based on 3 sets of 3D lookup tables. The lookup tables contain the resultant transformations for the specific entry as indexed by L*a*b*. Three tables are required: one mapping L*a*b* to C, one mapping L*a*b* to M, and one mapping L*a*b* to Y. Tri-linear interpolation can be used to give the final result for those entries not included in the tables. The process is shown in FIG. 19.

Tri-linear interpolation requires reading 8 values from the lookup table, and performing 7 linear interpolations (4 in the first dimension, 2 in the second, and 1 in the third). High precision can be used for the intermediate values, although the output value is only 8 bits.

The size of the lookup table required depends on the linearity of the transformation. The recommended size for each table in this application is 17×17×17, with each entry being 8 bits. A 17×17×17 table is 4913 bytes (less than 5 KB).

Although a 17×17×17 table will give excellent results, it is envisaged that a 9×9×9 conversion table (729 bytes) may be sufficient. The exact size can be determined by simulation. The 5 KB conservative-but-definite-results approach was chosen for the purposes of this example.

To index into the 17-per-dimension tables, the 8-bit input color components are treated as fixed-point numbers (4:4). The 4 bits of integer give the index, and the 4 bits of fraction are used for interpolation.

Figure 20:
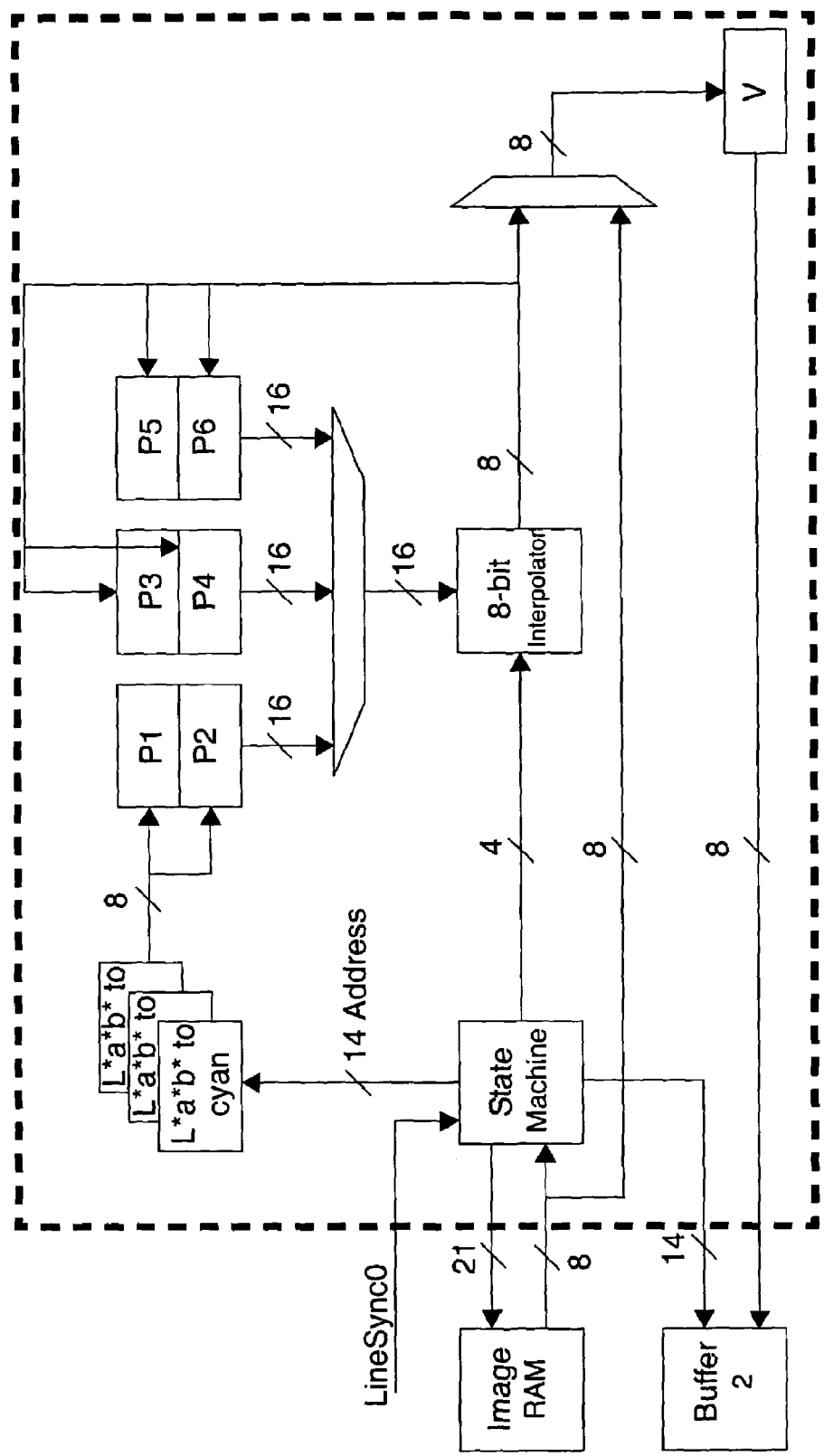
FIG. 20 is a block diagram of the conversion process from L*a*b* to CMY.

A block diagram of the conversion process from L*a*b* to CMY can be seen in FIG. 20. The conversion from L*a*b* to CMY must produce the contone buffer pixels (Buffer 2) at a rate fast enough to keep up with the UpInterpolate-Halftone-Reformat process (the remaining steps in the Image Print Chain, as shown in FIG. 17). Since each contone value is used for 36 cycles (6 times in each of the X and Y dimensions), the conversion process can take up to 36 cycles. This totals 108 cycles for all 3 color components.

The process as described here only requires 14 cycles per color component. The conversion is performed using tri-linear interpolation. Three 17×17×17 lookup tables are used for the conversion process: L*a*b* to Cyan, L*a*b* to Magenta, and L*a*b* to Yellow. However, since we have 36 cycles to perform each tri-linear interpolation, there is no need for a fast tri-linear interpolation unit. Instead, 8 calls to a linear interpolation process are more than adequate.

Address generation for indexing into the lookup tables is straightforward. The 4 most significant bits of each 8-bit color component are used for address generation, and the 4 least significant bits of each 8-bit color component are used for interpolating between values retrieved from the conversion tables. The addressing into the lookup table requires an adder due to the fact that the lookup table has dimensions of 17 rather than 16. Fortunately, multiplying a 4-bit number X by 17 is an 8-number XX, and therefore does not require an adder or multiplier. Multiplying a 4 bit number by $17^2$ (289) is only slightly more complicated, requiring a single add.

Although the interpolation could be performed faster, a single adder to generate addresses and a single cycle interpolation unit is used. Consequently, it is possible to calculate the interpolation for generating a single color component from L*a*b* in 14 cycles, as shown in Table 1. The process must be repeated 3 times in order to generate cyan, magenta, and yellow. Faster methods are possible, but are not necessary.

TABLE 1

Trilinear interpolation for color conversion from L*a*b* to CMY

| Cycle | Load | Effective Fetch | Adjust ADR register | Interpolate |
|---|---|---|---|---|
| 1 | | | ADR = 289L* | |
| 2 | | | ADR = ADR + 17a* | |
| 3 | | | ADR = ADR + b* | |
| 4 | P1 | L*a*b* | ADR = ADR + 1 | |
| 5 | P2 | L*a*b* + 1 | ADR = ADR + 16 | |
| 6 | P1 | L*a* + b* | ADR = ADR + 1 | P3 = P1 to P2 by b* |
| 7 | P2 | L*a* + b* + 1 | ADR = ADR + 271 | |
| 8 | P1 | L* + a*b* | ADR = ADR + 1 | P4 = P1 to P2 by b* |
| 9 | P2 | L* + a*b* + 1 | ADR = ADR + 16 | P5 = P3 to P4 by a* |
| 10 | P1 | L* + a* + b* | ADR = ADR + 1 | P3 = P1 to P2 by b* |
| 11 | P2 | L* + a* + b* + 1 | | |
| 12 | | | | P4 = P1 to P2 by b* |
| 13 | | | | P6 = P3 to P4 by a* |
| 14 | | | | V = P5 to P6 by L* |

As shown in Table 1, a single ADR register and adder can be used for address generation into the lookup tables. 6 sets of 8-bit registers can be used to hold intermediate results—2 registers hold values loaded from the lookup tables, and 4 registers are used for the output from the interpolation unit. Note that the input to the linear interpolation unit is always a pair of 8-bit registers P1/P2, P3/P4, and P5/P6. This is done deliberately to reduce register selection logic. In cycle 14, the "V" register holds the 8-bit value finally calculated. The 8-bit result can be written to the appropriate location in Buffer 2 during the next cycle.

Assuming the process is first run to generate cyan, the resultant cyan contone pixel is stored in the cyan contone buffer within Buffer 2. The process is then run again on the same L*a*b* input to generate the magenta pixel. This magenta contone pixel is stored into the magenta contone buffer of Buffer 2. Finally, the yellow contone pixel is generated from the same L*a*b* input, and the resultant yellow pixel is stored into the yellow contone buffer of Buffer 2.

The address generation for writing to the contone buffer (Buffer 2) is also straightforward. A single address (and accompanying ColorSelect bits) is used to write to each of the three color buffers. The Cyan buffer is written to on cycle 15, the Magenta on cycle 30, and Yellow on cycle 45. The pixel address is incremented by 1 every 75 cycles (after all 3 colors have been written). The line being written to increments with wrapping once every 6 LineSync0 pulses. The order of lines being written to is simply 0-1-2-3-4-5-0-1-2-3 . . . and so on.

If there is no conversion taking place (i.e. the image in Image RAM is already in CMY format), then the address generation for Buffer 2 remains the same. The only difference is that the multiplexor chooses the value directly from Image RAM instead of from the result of the interpolator.

Although each line is 534 contone pixels, as shown in FIG. 17, we only require 3200 bi-level dots for each line. The scaling up by 6 by the up-interpolator gives 3204 dots. The up-interpolator simply stops after generating 3200 dots, and does not read the final contone pixel more than twice.

Address generation for the Image RAM is very simple given that the image is stored in an interleaved fashion. A single address register contains the current address in Image RAM. During cycles 1, 2, and 3 of the 14 cycle group the address is read and incremented, thus reading L*, a*, and b* or C, M, and Y. This is done 534 times for each line and then the address generator stalls, waiting for the LineSync0 to enable the process to start again. The current address therefore gradually progresses through the entire image.

Figure 21:
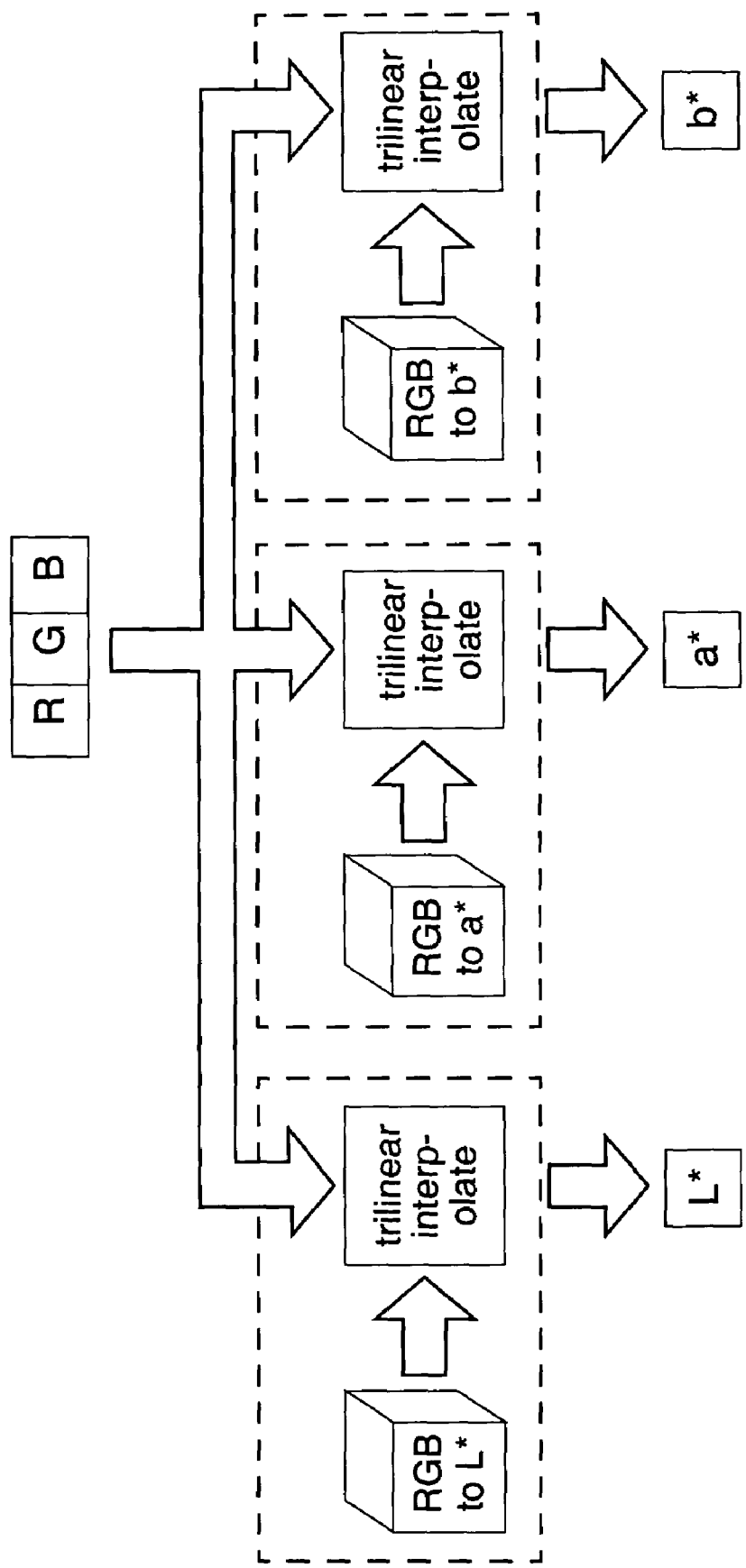
FIG. 21 represents a tri-linear conversion from RGB to L*a*b*.

A modification to the aforementioned conversion will now be described for the conversion from RGB to L*a*b* color space and two extra L* components for use in sharpening an image. The process for converting RGB to L*a*b* is shown in FIG. 21.

The color conversion process must produce contone L*a*b* pixels for the Sharpen process within 72 cycles. The sharpening process only requires the L* values corresponding to the first and third RGB sets, and only requires the full L*a*b* set for the second RGB set. Thus, we have 72 cycles in which to perform 5 color conversions (3 sets of RGB to L*, and 1 set each of RGB to a* and RGB to b*).

The process as described here requires 14 cycles per color component, leading to a total of 70 cycles for 5 conversions (leaving 2 cycles spare).

The conversion is performed as tri-linear interpolation. Three 17×17×17×8-bit lookup tables are used for the conversion process: RGB to L*, RGB to a*, and RGB to b*.

Address generation for indexing into the lookup tables is straightforward and is as described in the previous example.

Although the interpolation could be performed faster, again a single adder to generate addresses and a single cycle interpolation unit is used. Consequently, it is possible to calculate the interpolation for generating a single color component from RGB in 14 cycles, as shown in Table 2. The process must be repeated 5 times, once for each color conversion. Faster methods are possible, but are not necessary.

TABLE 2

Trilinear interpolation for color conversion from RGB to L*a*b*

| Cycle | Load | Effective Fetch | Adjust ADR register | Interpolate |
|---|---|---|---|---|
| 1 | | | ADR = 289R | |
| 2 | | | ADR = ADR + 17G | |
| 3 | | | ADR = ADR + B | |
| 4 | P1 | RGB | ADR = ADR + 1 | |
| 5 | P2 | RGB + 1 | ADR = ADR + 16 | |
| 6 | P1 | RG + 1B | ADR = ADR + 1 | P3 = P1 to P2 by B |
| 7 | P2 | RG + 1B + 1 | ADR = ADR + 271 | |
| 8 | P1 | R + 1GB | ADR = ADR + 1 | P4 = P1 to P2 by B |
| 9 | P2 | R + 1GB + 1 | ADR = ADR + 16 | P5 = P3 to P4 by G |
| 10 | P1 | R + 1G + 1B | ADR = ADR + 1 | P3 = P1 to P2 by B |
| 11 | P2 | R + 1G + 1B + 1 | | |
| 12 | | | | P4 = P1 to P2 by B |
| 13 | | | | P6 = P3 to P4 by G |
| 14 | | | | V = P5 to P6 by R |

Figure 22:
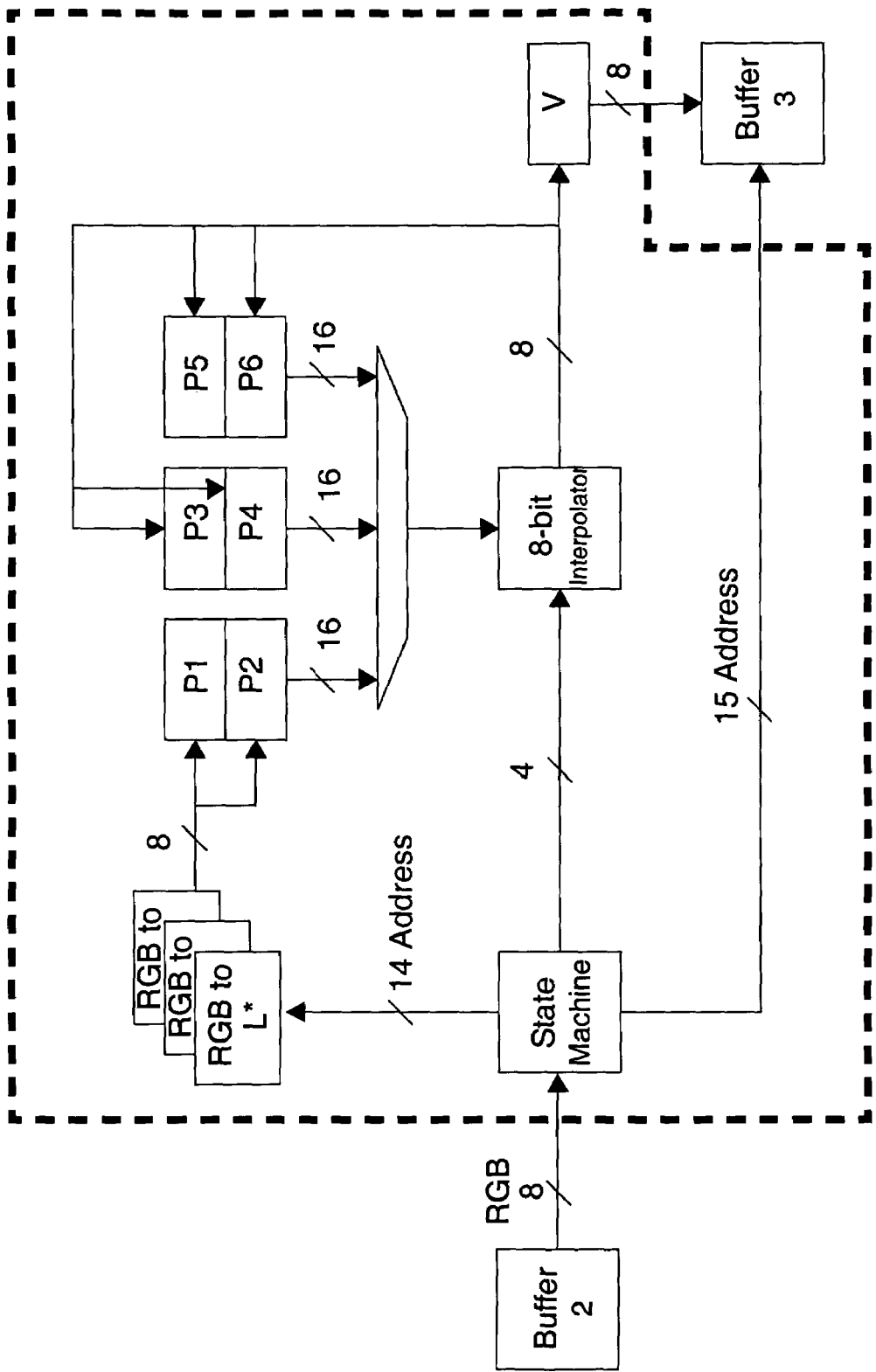
FIG. 22 is a block diagram of the conversion process from RGB to L*a*b*.

As shown in Table 2, a single ADR register and adder can still be used for address generation into the lookup tables. A block diagram of the color conversion process from RGB to L*a*b* can be seen in FIG. 22. As with the previous embodiment, 6 sets of 8-bit registers can be used to hold intermediate results—2 registers hold values loaded from the lookup tables, and 4 registers are used for the output from the interpolation unit. Note that the input to the linear interpolation unit is always a pair of 8-bit registers P1/P2, P3/P4, and P5/P6. This is done deliberately to reduce register selection logic. In cycle 14, the "V" register holds the 8-bit value finally calculated. The 8-bit result can be written to the appropriate location in Buffer 3 during the next cycle.

The basic 14 cycle color conversion process is run 5 times as follows:
on $RGB_1$ to generate $L^*_1$
on $RGB_2$ to generate $L^*_2$
on $RGB_3$ to generate $L^*_3$
on $RGB_2$ to generate a*
on $RGB_2$ to generate b*

Address generation for writing to Buffer 3 makes use of the cyclical nature of Buffer 3. The address consists of a 2-bit column component (representing which of the 4 columns should be written to), and a 3-bit value representing $L^*_1$, $L^*_2$, $L^*_3$, a*, or b*. The column number starts at 0 each new line and increments (with wrapping) every 72 cycles. The order of writing to Buffer 3 is shown in Table 3. The C register is the 2-bit column component of the address. All addition on C is modulo 4 (wraps within 2 bits).

TABLE 3

Write Access to Buffer 3 during 72 Cycle set

| Cycle | Address | Update C |
|---|---|---|
| 0 | | C = C + 1 |
| 14 | C, L1 | |
| 28 | C, L2 | |
| 42 | C, L3 | |
| 56 | C, a* | |
| 70 | C, b* | |

The present invention uses tri-linear interpolation, but only performs a single interpolation cycle such that the generation of a single color component from a tri-color space consumes 14 cycles. One benefit of this method is the minimization of the amount of silicon used.

1. Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

The invention claimed is:

1. A method of converting, in an image processor, from a first tri-color space to a second tri-color space, said method comprising the steps of:
reading color components of pixels of an image stored in a first tri-color space;
performing tri-linear conversion of said color components from said first color space to said second color space by looking up resultant transformation values in lookup tables for each of said pixel color components and performing linear interpolations on said transformation values; and
storing said converted color components in a specific storage location wherein eight said transformation values are read from said look up tables, which require seven said linear interpolations, of said seven linear interpolations, four are performed in a first dimension, two are performed in a second dimension, and one is performed in a third dimension.

2. The method of claim 1 wherein, for one color component of said pixels, said step of performing tri-linear conversion from said first color space to said second color space is completed in fourteen cycles, said performing step being repeated for each color component yet to be converted.

3. The method of claim 1 wherein said specific storage location is a dedicated buffer for each color component of said second tri-color space.

4. The method of claim 1 wherein said method is performed on-the-fly during a print process for a converted image.

5. The method of claim 1 wherein, if said first color space is the same as said second color space, said step of performing tri-linear conversion is bypassed.

6. The method of claim 1 wherein said first color space is L*a*b* form and said second color space is CMY form.

7. The method of claim 1 wherein said first color space is RGB form and said second color space is L*a*b* form.

8. The method of claim 7 wherein said step of performing color conversion is performed five times to produce two extra L* components for use in sharpening a converted image.

* * * * *